US012800606B2

(12) United States Patent
Bemden et al.

(10) Patent No.: US 12,800,606 B2
(45) Date of Patent: Nov. 17, 2026

(54) MULTI-FUNCTION AIR DATA PROBE WITH A PARTITIONED TIP AND PROCESS OF IMPLEMENTING THE SAME

(71) Applicant: Aerosonic, LLC, Clearwater, FL (US)

(72) Inventors: Gregory Van Bemden, Trinity, FL (US); Rajeev Atluri, New Port Richey, FL (US); Anthony Nguyen, Clearwater, FL (US)

(73) Assignee: Aerosonic, LLC, Clearwater, FL (US)

( * ) Notice: Subject to any disclaimer, the term of this patent is extended or adjusted under 35 U.S.C. 154(b) by 244 days.

(21) Appl. No.: 18/742,875

(22) Filed: Jun. 13, 2024

(65) Prior Publication Data

US 2024/0418739 A1 Dec. 19, 2024

Related U.S. Application Data

(60) Provisional application No. 63/472,956, filed on Jun. 14, 2023.

(51) Int. Cl.
*G01P 5/165* (2006.01)
*B64D 43/02* (2006.01)
*G01P 13/02* (2006.01)

(52) U.S. Cl.
CPC .............. *G01P 5/165* (2013.01); *B64D 43/02* (2013.01); *G01P 13/025* (2013.01)

(58) Field of Classification Search
CPC ........ G01P 5/165; G01P 13/025; B64D 43/02
See application file for complete search history.

(56) References Cited

U.S. PATENT DOCUMENTS

| | | | | |
|---|---|---|---|---|
| 3,244,001 | A * | 4/1966 | Pettingall | G01P 5/165 73/180 |
| 4,378,696 | A | 4/1983 | DeLeo et al. | |
| 4,718,273 | A | 1/1988 | McCormack | |
| 4,836,019 | A | 6/1989 | Hagen et al. | |
| 5,205,169 | A | 4/1993 | Hagen | |
| 5,797,105 | A * | 8/1998 | Nakaya | G01P 5/165 73/861.66 |
| 6,644,112 | B2 * | 11/2003 | Schulze | B64D 43/02 73/170.02 |
| 8,857,255 | B2 | 10/2014 | Anderson et al. | |
| 11,287,438 | B2 | 3/2022 | Inman et al. | |
| 2014/0251000 | A1 * | 9/2014 | Doolittle | G01L 15/00 73/178 R |

(Continued)

FOREIGN PATENT DOCUMENTS

| | | | |
|---|---|---|---|
| CN | 105988018 A * | 10/2016 | B64D 45/00 |

OTHER PUBLICATIONS

International Patent Application No. PCT/US2024/033791; Int'l Search Report and the Written Opinion; dated Oct. 2, 2024; 15 pages.

*Primary Examiner* — Jill E Culler
(74) *Attorney, Agent, or Firm* — Tucker Ellis LLP

(57) ABSTRACT

A multi-function air data probe includes a probe component; a probe tip; and at least one first port and at least one second port configured as angle of attack (AOA) measurement ports, angle of sideslip (AOS) measurement ports, static pressure measurement ports, and/or a pitot pressure inlet port. Additionally, the multi-function air data probe includes at least one raised portion arranged on the probe tip.

20 Claims, 12 Drawing Sheets

(56) References Cited

U.S. PATENT DOCUMENTS

| | | | | |
|---|---|---|---|---|
| 2014/0251001 | A1* | 9/2014 | Doolittle | G01L 15/00<br>73/178 R |
| 2018/0017591 | A1 | 1/2018 | Doolittle et al. | |
| 2021/0096149 | A1 | 4/2021 | Inman et al. | |
| 2021/0116474 | A1* | 4/2021 | Anderson | B64D 43/02 |
| 2021/0333099 | A1* | 10/2021 | Zhu | B64D 41/00 |
| 2023/0106016 | A1 | 4/2023 | Isebrand et al. | |

* cited by examiner

MULTI-FUNCTION AIR DATA PROBE WITH A PARTITIONED TIP AND PROCESS OF IMPLEMENTING THE SAME

CROSS-REFERENCE TO RELATED APPLICATIONS

This application claims the benefit from U.S. Provisional Application No. 63/472,956 filed on Jun. 14, 2023, which is hereby incorporated by reference in its entirety for all purposes as if fully set forth herein.

FIELD OF THE DISCLOSURE

The disclosure relates to a multi-function air data probe with a partitioned tip. Additionally, the disclosure relates to a process of implementing a multi-function air data probe with a partitioned tip. The disclosure relates to a multi-function air data probe having a tip with at least one raised portion. Additionally, the disclosure relates to a process of implementing a multi-function air data probe having a tip with at least one raised portion.

BACKGROUND OF THE DISCLOSURE

Typically, an aircraft airflow type sensor is implemented with a probe having a probe tip that is hemispherical shaped, partially spherical shaped, bullet shaped, elliptical cross section shaped, and/or the like. In particular, the aircraft airflow type sensor includes ports in proximity to the probe tip that may be utilized, in conjunction with other components, to collect air to measure a pressure thereof. Further, pressure differences (dP) around the probe tip may be utilized to determine angle of attack (AOA), angle of sideslip (AOS), and/or the like flight characteristics of an aircraft. The pressure difference (dP) is typically normalized by the impact pressure (qc), which is the difference between the total pressure (Pt) and the static pressure (Ps). However, the normalized pressure differences (dP/qc) around the probe tip for determination of the angle of attack (AOA) are highly dependent on airspeed and the addition of the angle of sideslip (AOS). In this regard, the measured pressure differences (dP) around the probe tip, and more specifically, dP/qc, inaccurately plateaus at around 35° angle of attack (AOA) due to flow separation behavior at or around the probe and/or the probe tip. Accordingly, the aircraft airflow type sensor has a limited envelope of accuracy.

For example, FIG. 10 illustrates a partial perspective view, FIG. 11 is a partial side view, and FIG. 12 is a partial front view of a prior art aircraft airflow type sensor 1 implemented with a probe 2 having a probe tip 3 that is hemispherical shaped. In particular, the prior art aircraft airflow type sensor 1 includes a port 4 arranged in the probe tip 3 as well as ports 6 to collect air to measure a pressure. In this regard, the measured pressure differences (dP) around the probe tip 3 may be utilized to determine angle of attack (AOA), angle of sideslip (AOS), and/or the like flight characteristics of an aircraft. The pressure difference (dP) is typically normalized by the impact pressure (qc), which is the difference between the total pressure (Pt) and the static pressure (Ps). However, the normalized pressure differences (dP/qc) around the probe tip 3 for determination of the angle of attack (AOA) are highly dependent on airspeed and the addition of the angle of sideslip (AOS). In this regard, the measured pressure differences (dP) around the probe tip 3, and more specifically, dP/qc, inaccurately plateaus at around 35° angle of attack (AOA) due to flow separation behavior at or around the probe 2 and/or the probe tip 3. Accordingly, the aircraft airflow type sensor 1 has a limited envelope of accuracy.

Accordingly, what is needed is a multi-function air data probe implementation configured with increased accuracy and/or the like. Further, what is needed is a process of implementing a multi-function air data probe implementation configured with increased accuracy and/or the like.

SUMMARY OF THE DISCLOSURE

The foregoing needs are met, to a great extent, by the disclosure, wherein aspects include a multi-function air data probe having a tip with raised portions and a process of implementing a multi-function air data probe having a tip with raised portions are provided.

In aspects, the disclosure is directed to a multi-function air data probe having a tip with one or more raised portions. In particular, a ridged tip with "fins" placed radially around the ridged tip in, for example, a cross pattern. Further, angle of attack (AOA), angle of sideslip (AOS) ports, and/or the like may be placed on the ridged tip that may include a pitot pressure inlet.

In aspects, the multi-function air data probe implementing the ridged tip for AOA determination may have a sensitivity (dP (pressure difference) at various AOA) that may be 5-10% greater in comparison to prior art aircraft airflow type sensors. In aspects, the multi-function air data probe implementing the ridged tip for AOA determination may have improved linearity (change in rate dP/qc increases with AOA) in comparison to prior art aircraft airflow type sensors especially at values of 35° or more AOA. In aspects, the multi-function air data probe implementing the ridged tip may have a higher temperature at the tip due to removal of material and heater positioning in comparison to prior art aircraft airflow type sensors. This may be beneficial in a reduction of icing of the multi-function air data probe; and this may be beneficial in a reduction of heating energy usage of the multi-function air data probe.

Aspects of the disclosure are directed to a multi-function air data probe with concave facets separated by one or more raised partitions placed radially at the tip of the probe for generating stronger pressure differences.

Traditional multi-function air data probes employ a hemispherical probe tip which has more material around the tip of the probe which requires more power to heat the probe tip. Other traditional multi-function air data probes employ an ogive tip that typically are not able to have heaters closer to the tip. Further, the traditional tips are susceptible to lower sensitivity to changes of angle-of-attack and/or angle-of-sideslip because of the air flow separation at higher angles caused by the probe tip's geometry.

Newer aircraft require smaller, lighter, and less power consuming air data systems. A multi-function probe reduces the shipset weight on the aircraft, but has limitations such as power consumption and sensitivity to change at higher angle-of-attack and angle-of sideslip.

The disclosed multi-function air data probe includes an air flow separating probe tip that was designed to remove material from around the probe tip so less power is needed to heat the tip portion of the probe, while simultaneously minimizing the distance the heater is to the tip. A secondary benefit was that the raised partitions allowed for the airflow to separate at the tip and generate a strong region of suction when the probe is at angle inclined to the flow.

The multi-function air data probe has several pressure-sensing ports at the tip of the probe and along the sleeve.

When the probe is immersed in flow at an angle of attack or sideslip, the probe generates a pressure difference around the probe. This pressure difference can be used to determine the angle of attack or sideslip of the probe, using the ports located at the tip.

At the tip, there are several raised partitions placed radially at the tip in order to separate the incoming airflow from the surface of the probe tip, thus generating a strong negative pressure region and increasing the pressure difference between the facets directly facing the flow and the facets facing away from the flow. The subdivision of regions by these raised partitions also allows the pressure difference behavior to be less influenced by additional sideslip and changes in flow speed. In addition to aerodynamic advantages, the raised partitions allow for internal heaters to be placed close to the tip while removing material to increase tip temperatures for improved performance in-flight anti-icing.

The aspects described herein allow multi-function probes to be used at a broad range of speeds and greater angle of attack and/or angle-of-sideslip.

In one aspect, a multi-function air data probe includes a probe component. The multi-function air data probe in addition includes a probe tip. The multi-function air data probe moreover includes at least one first port and at least one second port configured as angle of attack (AOA) measurement ports, angle of sideslip (AOS) measurement ports, static pressure measurement ports, and/or a pitot pressure inlet port. The multi-function air data probe also includes at least one raised portion arranged on the probe tip.

In one aspect, a multi-function air data probe includes a probe component. The multi-function air data probe in addition includes a probe tip. The multi-function air data probe moreover includes at least one raised portion arranged on the probe tip.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the disclosure. It is important, therefore, that the claims be regarded as including such equivalent constructions insofar as they do not depart from the spirit and scope of the disclosure.

DETAILED DESCRIPTION

Figure 1:
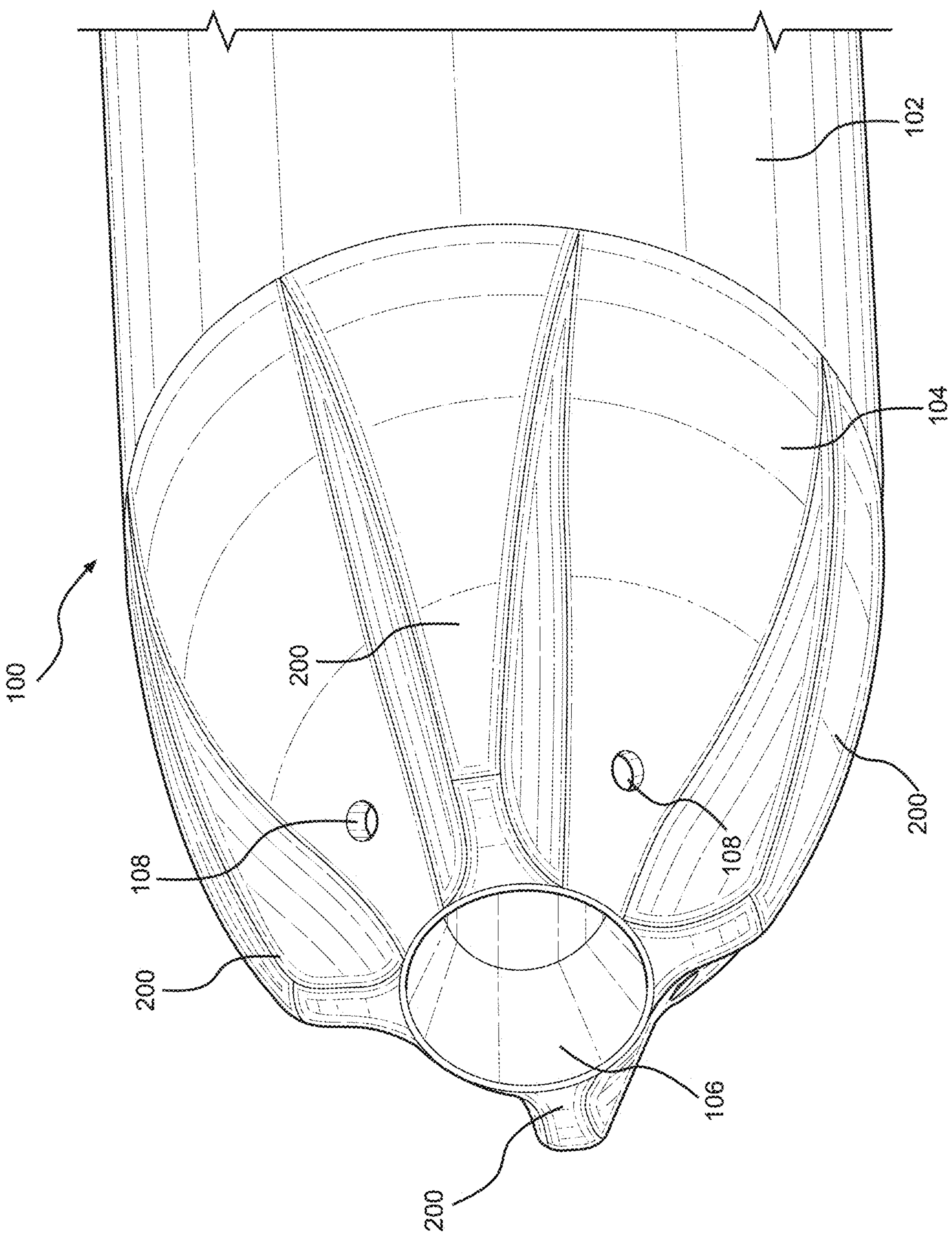
FIG. 1 illustrates a partial perspective view of a multi-function air data probe according to the disclosure.

The disclosure will now be described with reference to the drawing figures, in which like reference numerals refer to like parts throughout. Aspects of the disclosure advantageously provide a multi-function air data probe with a partitioned tip, a process of implementing a multi-function air data probe with a partitioned tip, a multi-function air data probe having a tip with at least one raised portion, and a process of implementing a multi-function air data probe having a tip with at least one raised portion.

FIG. 1 illustrates a partial perspective view of a multi-function air data probe according to the disclosure.

Figure 2:
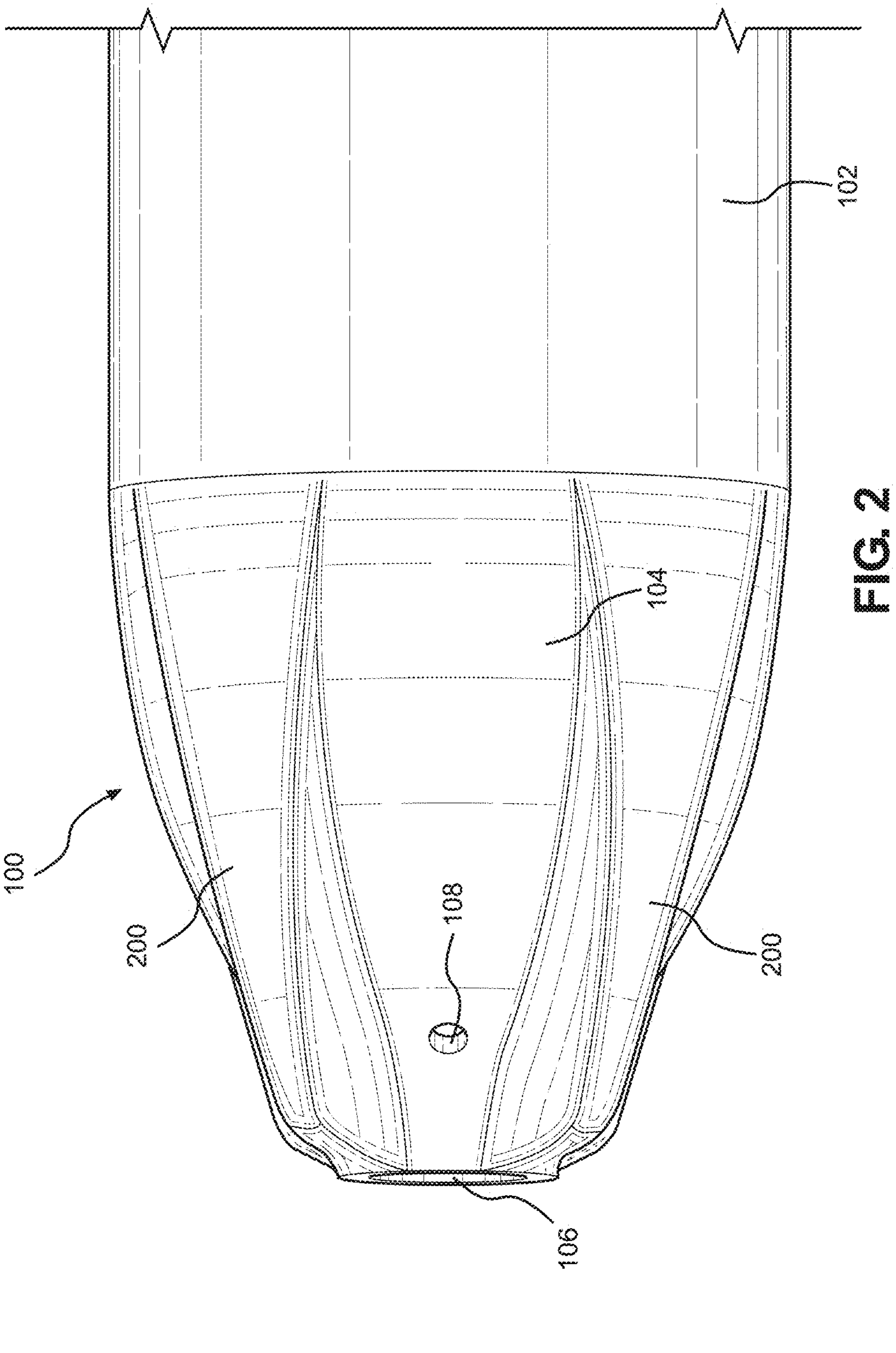
FIG. 2 illustrates a partial side view of the multi-function air data probe according to FIG. 1.

FIG. 2 illustrates a partial side view of the multi-function air data probe according to FIG. 1.

Figure 3:
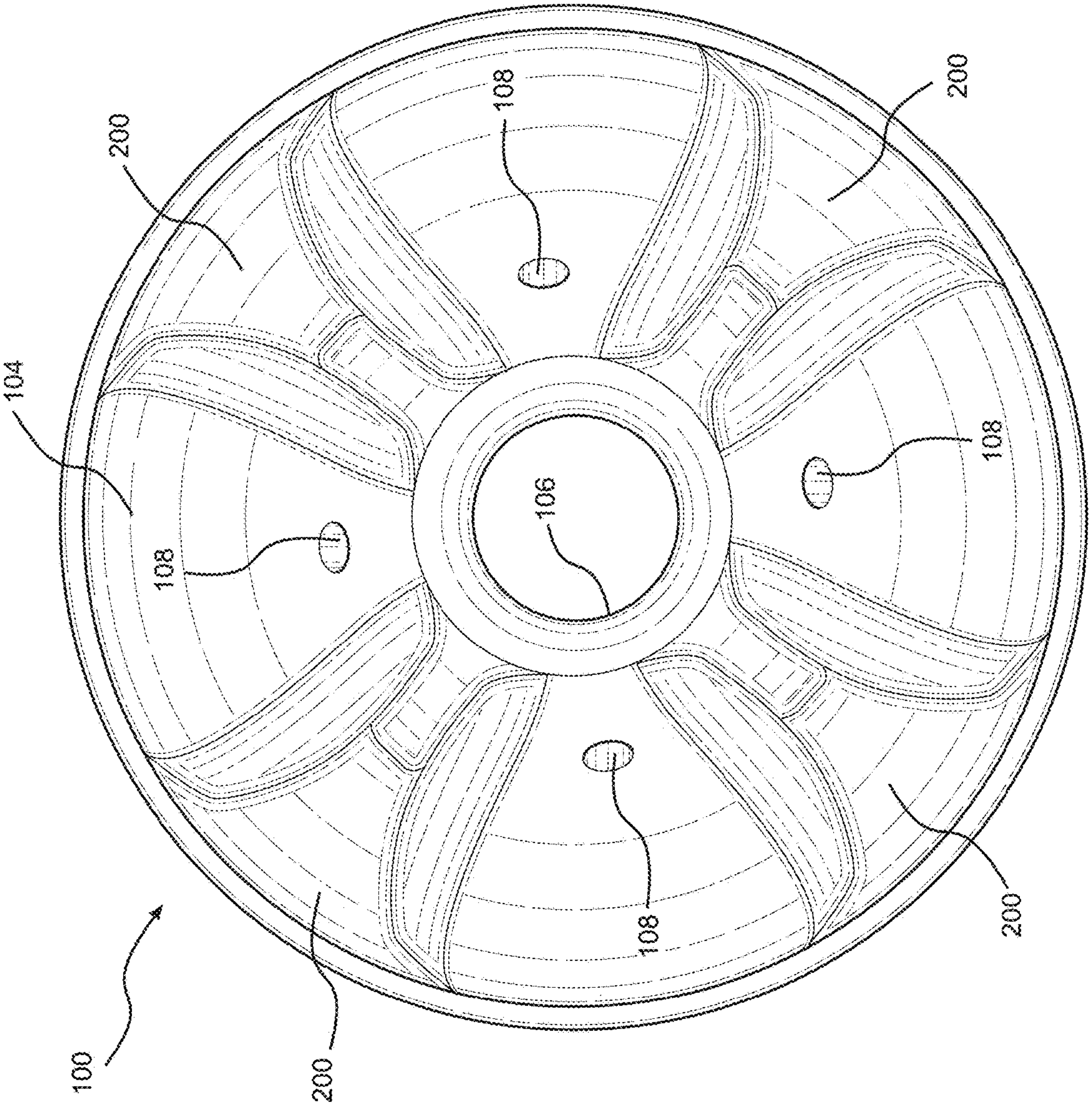
FIG. 3 illustrates a front view of the multi-function air data probe according to FIG. 1.

FIG. 3 illustrates a front view of the multi-function air data probe according to FIG. 1.

In particular, FIG. 1 illustrates a multi-function air data probe 100 configured to be mounted to an aircraft for measurement of various airflow characteristics and/or aircraft flight characteristics. In aspects, the multi-function air data probe 100 may include a probe 102, a probe tip 104, at least one first port 106, at least one second port 108, and/or the like. In aspects, the at least one first port 106, the at least one second port 108, and/or the like may be configured as angle of attack (AOA) measurement ports, angle of sideslip (AOS) measurement ports, static pressure measurement ports, a pitot pressure inlet port, and/or the like.

Additionally, the probe 102, the probe tip 104, and/or the multi-function air data probe 100 may be implemented with at least one raised portion 200. In aspects, the at least one raised portion 200 may be configured as a raised surface, a ridged surface, a raised portion, a ridged portion, a fin, a ridged fin, a partitioned portion, a partition, a raised partition, and/or the like. In aspects, there may be a single implementation of the at least one raised portion 200, a plurality of implementations of the at least one raised portion 200, implementations of the at least one raised portion 200 arranged radially around the probe tip 104, two implementations of the at least one raised portion 200 arranged radially around the probe tip 104, three implementations of the at least one raised portion 200 arranged radially around the probe tip 104, four implementations of the at least one raised portion 200 arranged radially around the probe tip 104, five implementations of the at least one raised portion 200 arranged radially around the probe tip 104, six implementations of the at least one raised portion 200 arranged radially around the probe tip 104, and/or any number of implementations of the at least one raised portion 200 arranged radially around the probe tip 104. In aspects, implementations of the at least one raised portion 200 may be arranged symmetrically around the probe tip 104. In aspects, implementations of the at least one raised portion 200 may be arranged asymmetrically around the probe tip 104.

Further, the at least one first port 106 and/or the at least one second port 108 may be configured in conjunction with other components of the multi-function air data probe 100 to collect air to measure an angle of attack (AOA), an angle of sideslip (AOS), and/or the like various airflow characteristics and/or aircraft flight characteristics. In one aspect, the at least one first port 106 may be configured as a pitot pressure inlet. In aspects, the at least one second port 108 may be placed on the probe tip 104 and in proximity to the at least one raised portion 200. In aspects, the at least one second port 108 may be placed on the probe tip 104 vertically adjacent the at least one raised portion 200. In aspects, the at least one second port 108 may be placed on the probe tip 104 and between implementations of the at least one raised portion 200.

In a particular aspect, there may be four implementations of the at least one raised portion 200 arranged radially and symmetrically around the probe tip 104 in a cross pattern. Additionally, implementations of the at least one second port 108 may be arranged between each implementation of the at least one raised portion 200. Further, the at least one first port 106 may be configured as a pitot pressure inlet.

In aspects, the at least one raised portion 200 may be configured to increase a sensitivity of measurements of various airflow characteristics and/or aircraft flight characteristics by the at least one first port 106 and/or the at least one second port 108 by the multi-function air data probe 100.

In aspects, the at least one raised portion 200 may be configured to limit flow separation behavior by the multi-function air data probe 100 at or around the probe 102 and/or the probe tip 104. In this regard, separation behavior impacts accurate measurement of various airflow characteristics and/or aircraft flight characteristics by the multi-function air data probe 100.

In aspects, the at least one raised portion 200 of the multi-function air data probe 100 may be configured to increase an envelope of accuracy of measurement of various airflow characteristics and/or aircraft flight characteristics of the multi-function air data probe 100.

In aspects, the at least one raised portion 200 may be configured make the multi-function air data probe 100 be less dependent on airspeed and the addition of the angle of sideslip (AOS).

In aspects, the at least one raised portion 200 may be configured to make the multi-function air data probe 100 have improved linearity with respect to various airflow characteristics and/or aircraft flight characteristics measured by the at least one first port 106 and the at least one second port 108.

In aspects, the at least one raised portion 200 may be configured to make the multi-function air data probe 100 have a sensitivity (dP (pressure difference) at various AOA) that may be 5-10% greater in comparison to prior art multi-function air data probes.

In aspects, the at least one raised portion 200 may be configured to make the multi-function air data probe 100 have improved linearity (change in rate dP/qc increases with AOA) in comparison to prior art multi-function air data probes especially at values of 35° or more AOA.

Figure 4:
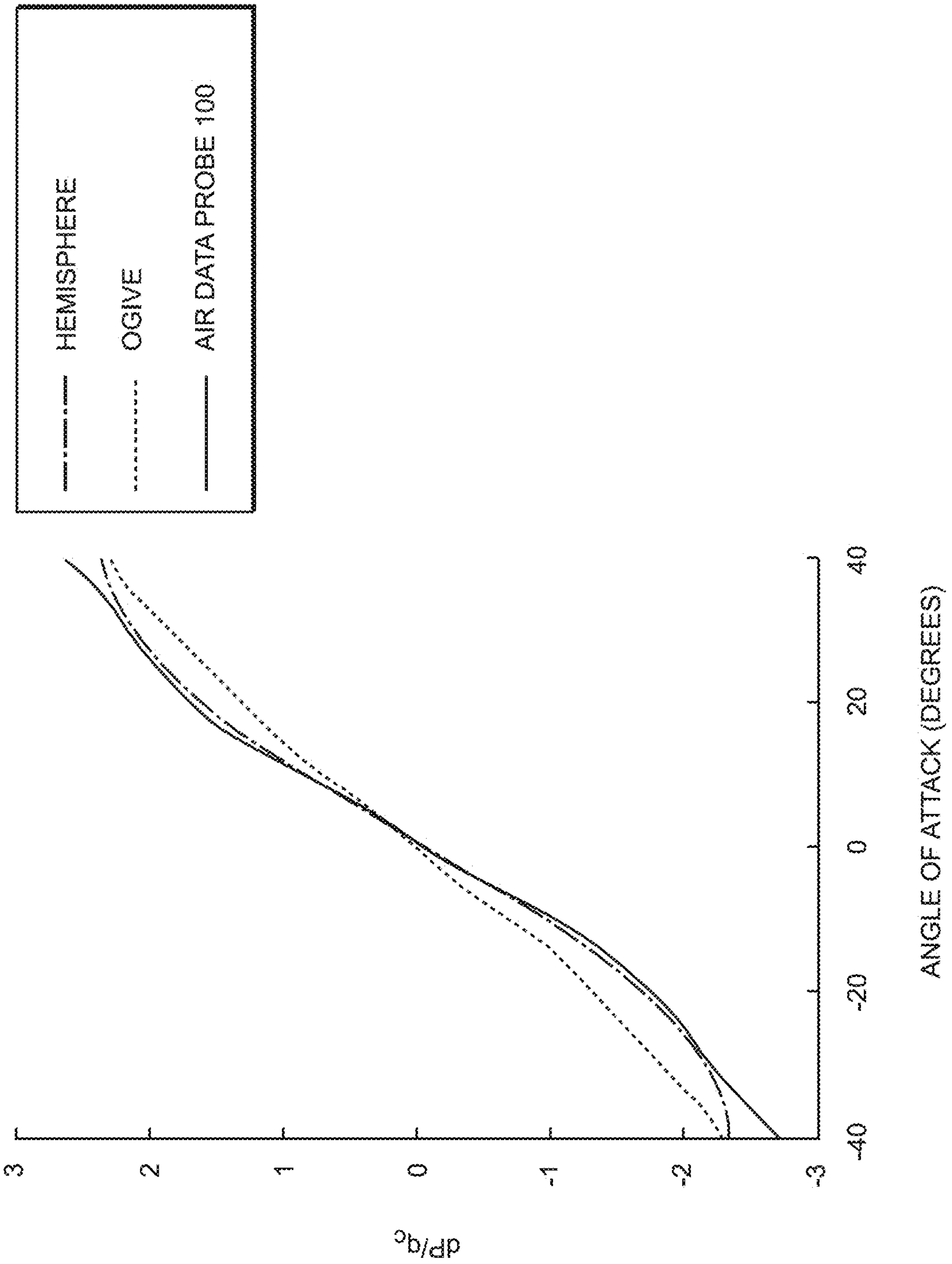
FIG. 4 illustrates a graph of a normalized pressure difference (dP/qc) versus angle of attack (AoA) of a prior art hemisphere shaped airflow sensor; a graph of a normalized pressure difference (dP/qc) versus angle of attack (AoA) of a prior art ogive shaped airflow sensor; and a graph of a normalized pressure difference (dP/qc) versus angle of attack (AoA) of the multi-function air data probe implementing the at least one raised portion according to aspects of the disclosure.

FIG. 4 illustrates a graph of a normalized pressure difference (dP/qc) versus angle of attack (AoA) of a prior art hemisphere shaped airflow sensor; a graph of a normalized pressure difference (dP/qc) versus angle of attack (AoA) of a prior art ogive shaped airflow sensor; and a graph of a normalized pressure difference (dP/qc) versus angle of attack (AoA) of the multi-function air data probe implementing the at least one raised portion according to aspects of the disclosure.

Figure 10:
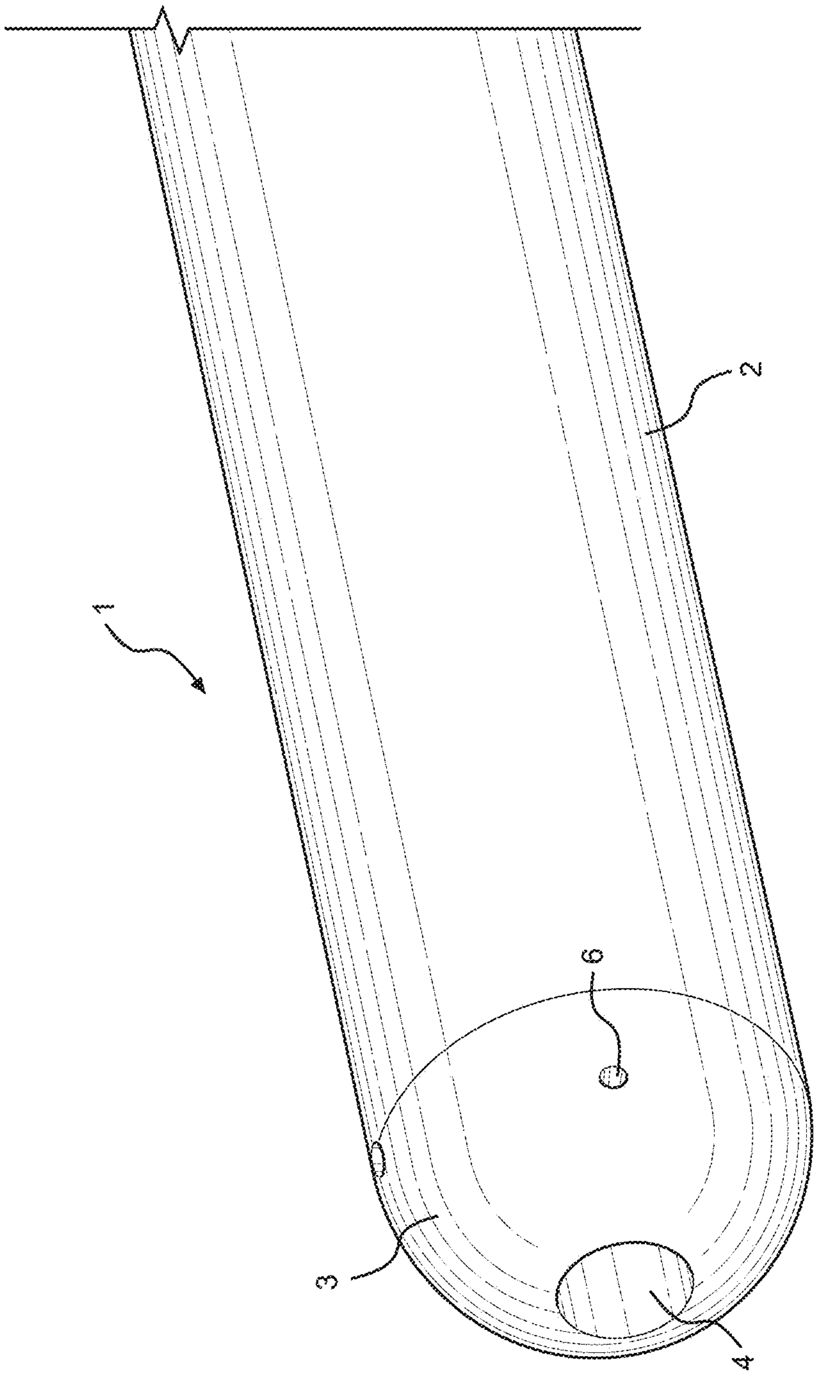
FIG. 10 PRIOR ART
FIG. 10 illustrates a partial perspective view of a prior art aircraft airflow type sensor.
Figure 11:
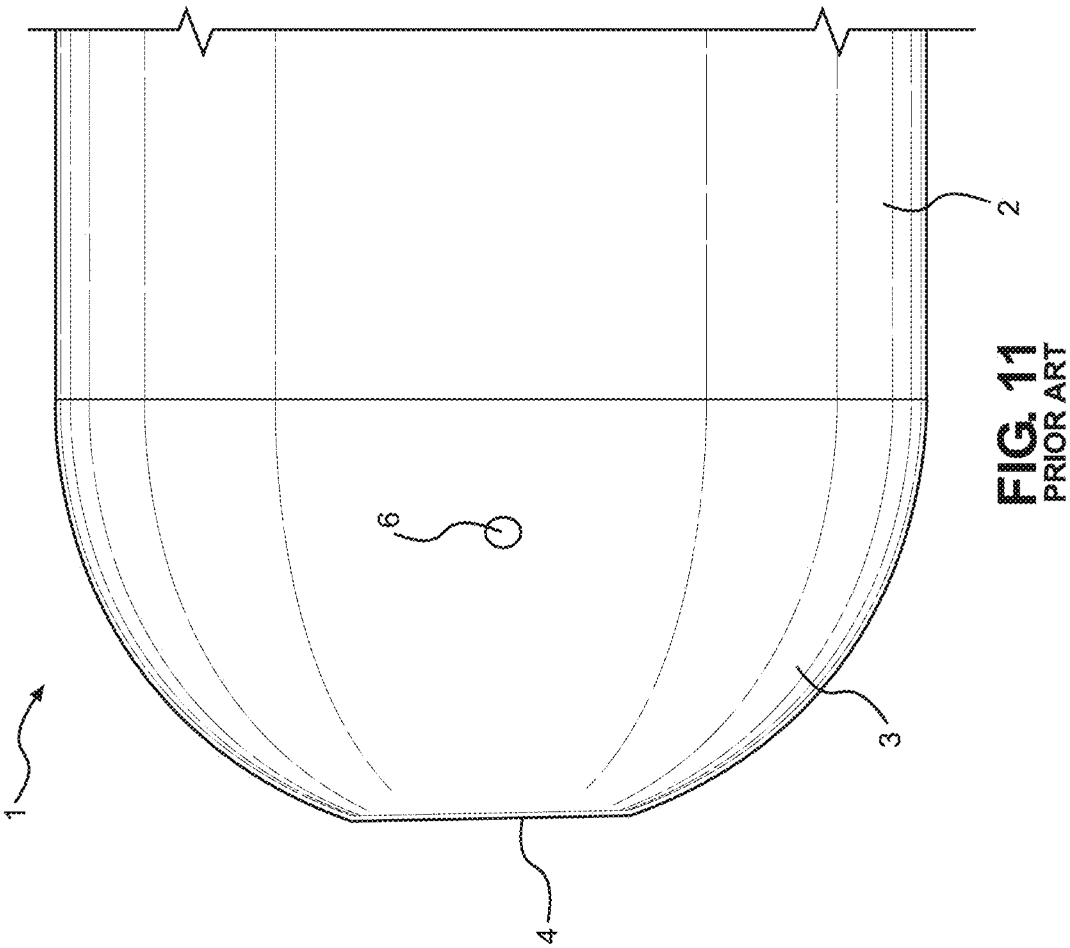
FIG. 11 PRIOR ART
FIG. 11 is a partial side view of a prior art aircraft airflow type sensor.
Figure 12:
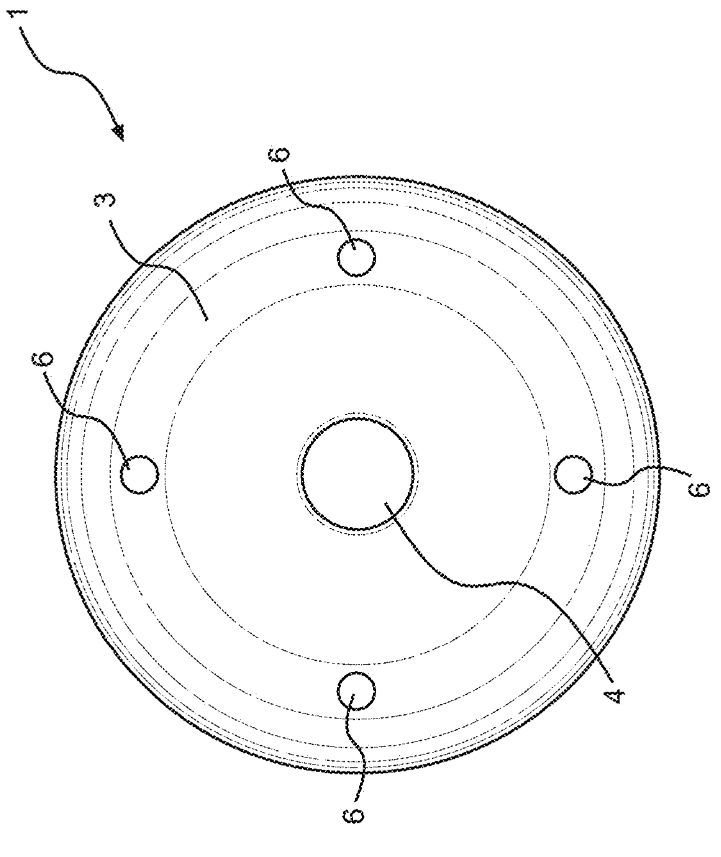
FIG. 12 PRIOR ART
FIG. 12 is a partial front view of a prior art aircraft airflow type sensor.

In particular, FIG. 4 illustrates a graph 10 of a normalized pressure difference (dP/qc) versus angle of attack (AoA) in degrees of a prior art hemisphere shaped airflow sensor such as the prior art aircraft airflow type sensor 1 illustrated in FIG. 10. As illustrated in FIG. 4, the measurement of the angle of attack of the prior art aircraft airflow type sensor 1 becomes nonlinear at approximately 35° of angle of attack (AoA). Additionally, FIG. 4 illustrates a graph 12 of a normalized pressure difference (dP/qc) versus angle of attack (AoA) in degrees of a prior art ogive shaped airflow sensor. As illustrated in FIG. 4, the measurement of the angle of attack of the prior art aircraft airflow type sensor 1 becomes nonlinear at approximately 35° of angle of attack (AoA).

Further, FIG. 4 illustrates a graph 600 of a normalized pressure difference (dP/qc) versus angle of attack (AoA) of the multi-function air data probe 100 implementing the at least one raised portion 200 according to aspects of the disclosure. In particular, the graph 600 illustrates the multi-function air data probe 100 implementing the at least one raised portion 200. As illustrated in FIG. 4, the multi-function air data probe 100 implementing the at least one raised portion 200 has increased measurement linearity.

Figure 5:
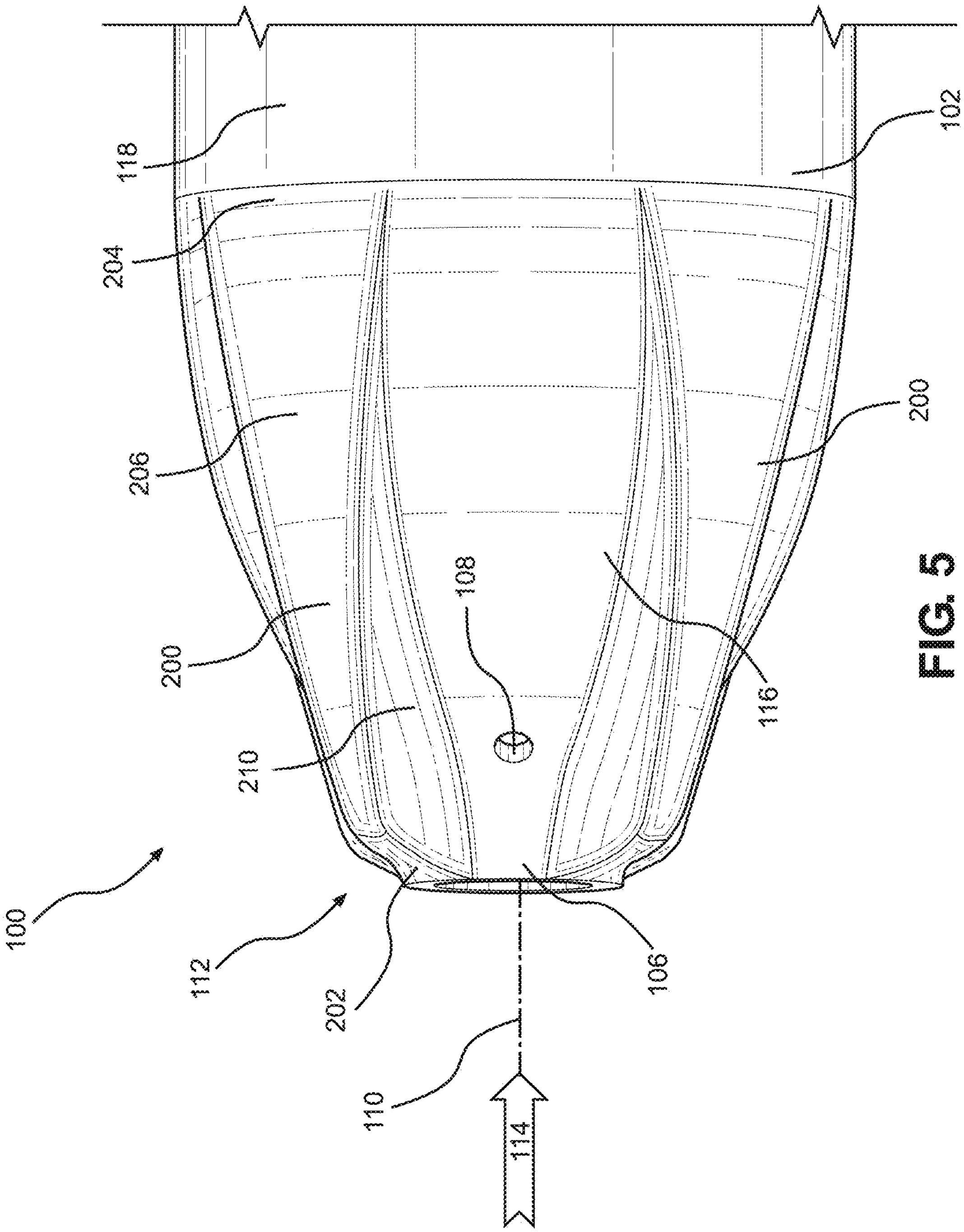
FIG. 5 illustrates a further partial side view of the multi-function air data probe according to FIG. 1.

FIG. 5 illustrates a further partial side view of the multi-function air data probe according to FIG. 1.

Figure 6:
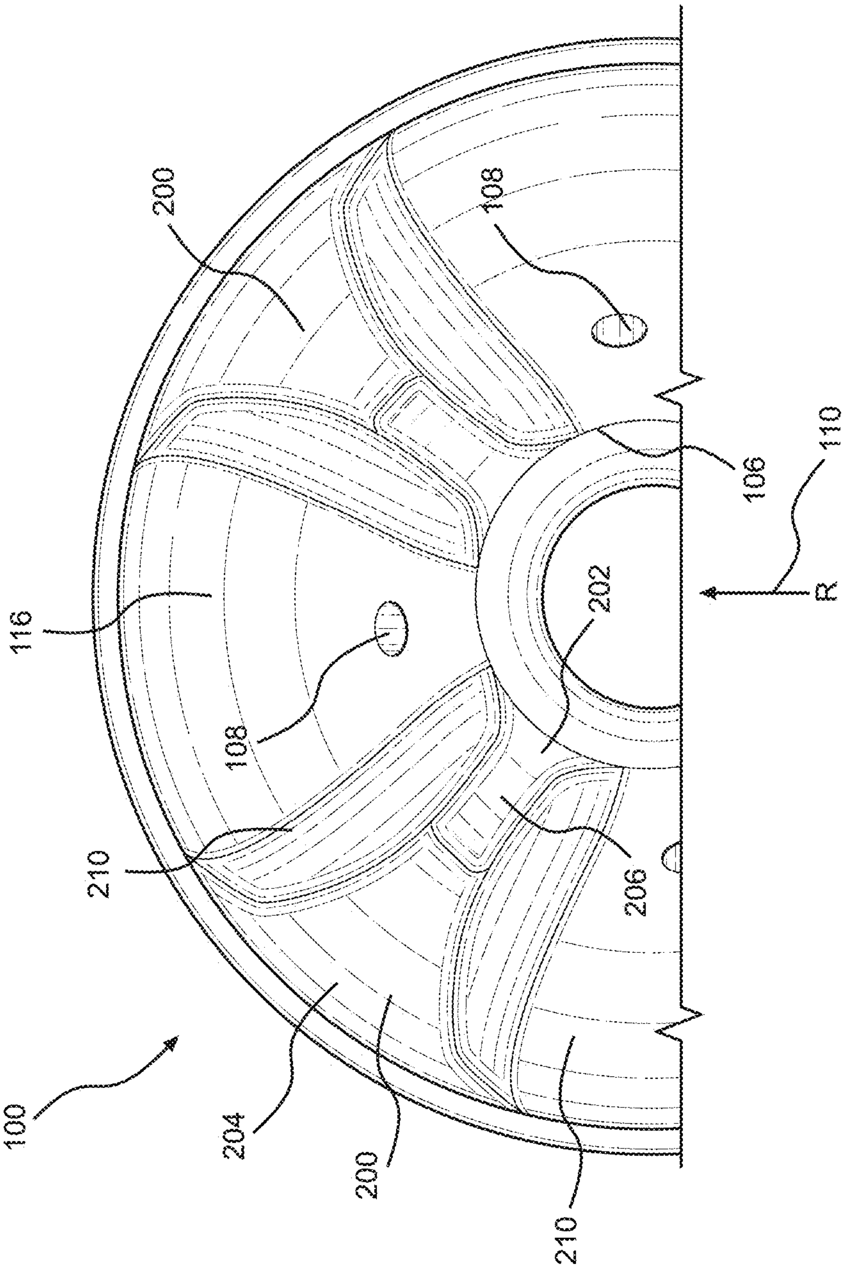
FIG. 6 illustrates a partial front view of the multi-function air data probe according to FIG. 1.

FIG. 6 illustrates a partial front view of the multi-function air data probe according to FIG. 1.

In particular, FIG. 5 illustrates a further partial side view of the multi-function air data probe 100 and exemplary details of the at least one raised portion 200. In this regard, the at least one first port 106 of the multi-function air data probe 100 may be arranged at a forward end 112 of the probe 102 such that the at least one first port 106 directly receives an airflow 114. The airflow 114 traveling along the X axis as illustrated in FIG. 5.

In aspects, the at least one raised portion 200 may be arranged downstream from the at least one first port 106 and the forward end 112 of the probe 102. Further, the at least one raised portion 200 may extend along the probe tip 104 along the x-axis and/or longitudinal axis. In aspects, the at least one raised portion 200 may extend radially outwardly (radial axis R) from a probe center line 110 of the multi-function air data probe 100. In aspects, the at least one raised portion 200 may extend radially outwardly (radial axis R) from a surface of the probe tip 104.

In aspects, the at least one raised portion 200 may include a ridge leading edge 202. The ridge leading edge 202 may be arranged adjacent and/or directly adjacent the at least one first port 106. In aspects, the ridge leading edge 202 may be arranged adjacent and/or directly adjacent the forward end 112 of the probe 102.

In aspects, the at least one raised portion 200 may include a ridge trailing edge 204. The ridge trailing edge 204 may be arranged distally from the at least one first port 106 and/or the ridge leading edge 202. In aspects, the ridge trailing edge 204 may be arranged distally from the forward end 112 of the probe 102.

In aspects, the ridge leading edge 202 of the at least one raised portion 200 may be arranged radially closer to the probe center line 110 of the probe 102 then the ridge trailing edge 204 of the at least one raised portion 200. In this regard, the at least one raised portion 200 may extend radially outwardly from the probe center line 110 as the at least one raised portion 200 extends in the X direction from the ridge leading edge 202 to the ridge trailing edge 204.

Additionally, the at least one raised portion 200 may include a connecting surface 206 that extends from the ridge leading edge 202 to the ridge trailing edge 204. The connecting surface 206 may be a curved surface that extends from the ridge leading edge 202 to the ridge trailing edge 204.

In aspects, the at least one second port 108 may be arranged in the probe tip 104 adjacent to the at least one raised portion 200. In aspects of the probe 102 implementing a plurality of the at least one raised portion 200, the at least one second port 108 may be arranged between two implementations of the at least one raised portion 200.

Further, the probe 102 may include a curved tip surface 116 that may extend from the forward end 112 and/or the at least one first port 106 toward a back of the multi-function air data probe 100 and/or a main body 118 of the multi-function air data probe 100. The main body 118 may be cylindrical in shape.

Additionally, the curved tip surface 116 may extend radially from the probe center line 110. In particular, the curved tip surface 116 may be arranged closest to the probe center line 110 adjacent the forward end 112 and/or the at least one first port 106; and the curved tip surface 116 may be arranged farthest from the probe center line 110 as the curved tip surface 116 approaches the main body 118. In aspects, as the curved tip surface 116 extends from the forward end 112, a shape thereof may transition into the shape of the main body 118.

In aspects, the at least one raised portion 200 may extend radially from the probe center line 110. In particular, the at least one raised portion 200 may be arranged closest to the probe center line 110 adjacent the forward end 112 and/or the at least one first port 106; and the at least one raised portion 200 may be arranged farthest from the probe center line 110 as the at least one raised portion 200 approaches the main body 118. In aspects, as the at least one raised portion 200 extends from the forward end 112, a shape thereof may transition into the shape of the main body 118.

Additionally, the at least one raised portion 200 may include ridge side surfaces 210. In aspects, the ridge side surfaces 210 may extend along the x-axis from the ridge leading edge 202 to the ridge trailing edge 204. In aspects, the ridge side surfaces 210 may extend from the connecting surface 206 to the curved tip surface 116. In aspects, the ridge side surfaces 210 may extend radially outward from the curved tip surface 116. Further, the ridge side surfaces 210 may have a shape that transitions into the main body 118 as the ridge side surfaces 210 extend toward the main body 118.

In aspects, the ridge leading edge 202 may be configured to have a leading edge width or a radial leading edge width; and the ridge trailing edge 204 may be configured to have a trailing edge width or a radial trailing edge width. As illustrated in FIG. 6, the leading edge width of the ridge leading edge 202 may be smaller than the trailing edge width of the ridge trailing edge 204.

In aspects, a construction and arrangement of the ridge leading edge 202, the ridge trailing edge 204, and the ridge side surfaces 210 of the at least one raised portion 200 provide a curved surface around and/or adjacent the at least one second port 108.

In aspects, a construction and arrangement of the ridge leading edge 202, the ridge trailing edge 204, and the ridge side surfaces 210 of the at least one raised portion 200 provide a curved surface connected to the curved tip surface 116 of the probe tip 104.

In aspects, a construction and arrangement of the ridge leading edge 202, the ridge trailing edge 204, and the ridge side surfaces 210 of the at least one raised portion 200 provide a non-faceted and/or smooth edged construction of the probe tip 104.

In aspects, a construction and arrangement of the ridge leading edge 202, the ridge trailing edge 204, and the ridge side surfaces 210 of the at least one raised portion 200 provide flow separation for the at least one second port 108.

In aspects, a construction and arrangement of the ridge leading edge 202, the ridge trailing edge 204, and the ridge side surfaces 210 of the at least one raised portion 200 generate turbulent air adjacent the probe tip 104. In aspects, the turbulent air adjacent the probe tip 104 results in increased ice deflection.

In aspects, the curved tip surface 116 may be configured as concave facets separated by the at least one raised portion 200 that may form one or more raised partitions placed radially at the probe tip 104 of the multi-function air data probe 100 for generating stronger pressure differences.

In aspects, the probe tip 104 may be configured as an air flow separating probe tip that was designed to remove material from around the probe tip 104 so less power is needed to heat the probe tip 104 of the multi-function air data probe 100, while simultaneously minimizing the distance the heater 170 is to the probe tip 104.

A secondary benefit may be that the at least one raised portion 200 configured as raised partitions may allow for the airflow to separate at the probe tip 104 and generate a strong region of suction when the multi-function air data probe 100 is at angle inclined to the flow.

In aspects, at the probe tip 104 of the multi-function air data probe 100, the at least one raised portion 200 may be configured as several raised partitions placed radially at the probe tip 104 in order to separate the incoming airflow from the surface of the probe tip 104, thus generating a strong negative pressure region and increasing the pressure difference between the facets directly facing the flow and the facets facing away from the flow. The subdivision of regions by these raised partitions also allows the pressure difference behavior to be less influenced by additional sideslip and changes in flow speed. In addition to aerodynamic advantages, the raised partitions allow for internal heaters to be placed close to the tip while removing material to increase tip temperatures for improved performance in-flight anti-icing.

Figure 7:
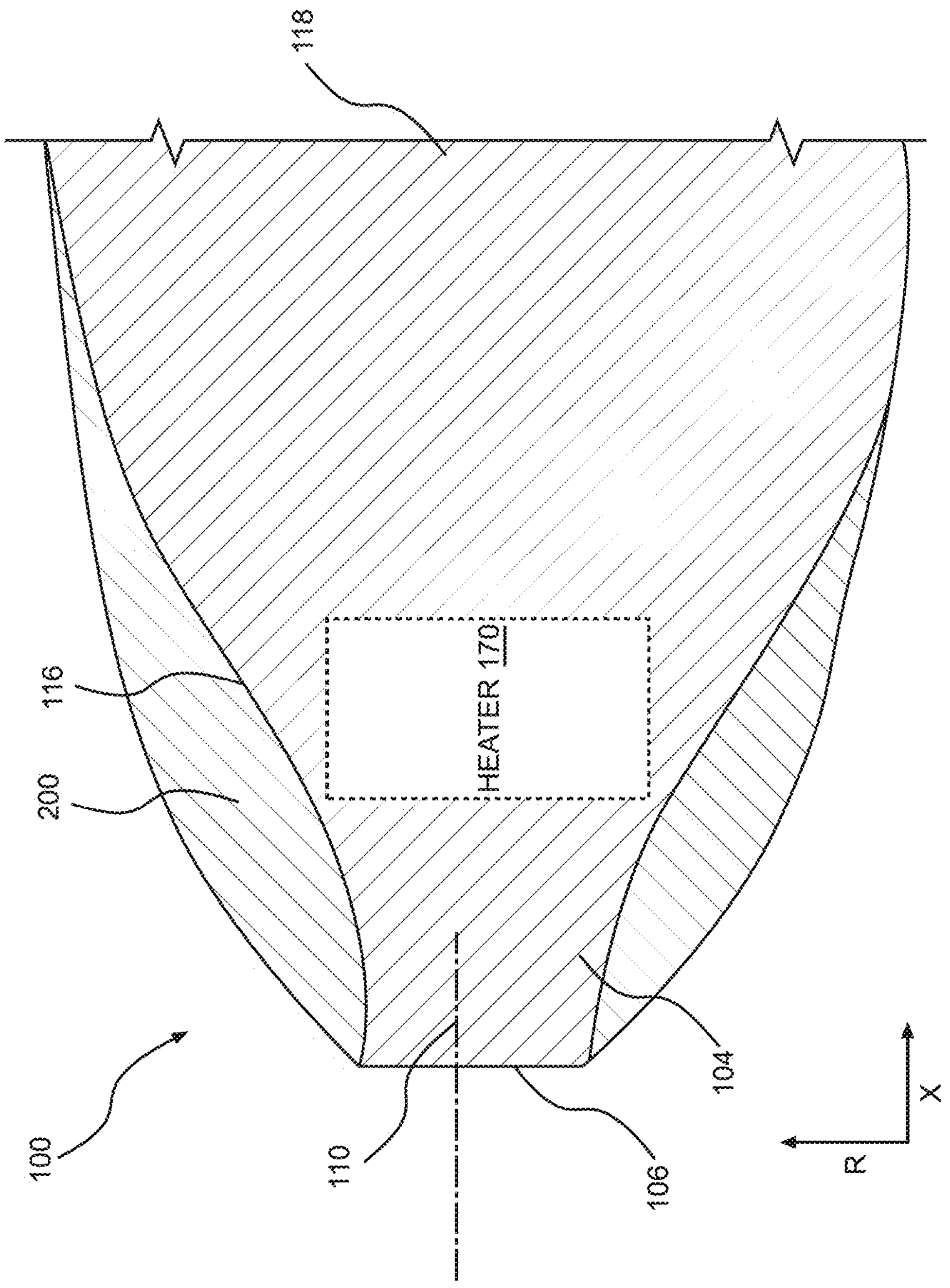
FIG. 7 is a partial cross-sectional view of the multi-function air data probe according to FIG. 5.

FIG. 7 is a partial cross-sectional view of the multi-function air data probe according to FIG. 5.

Figure 8:
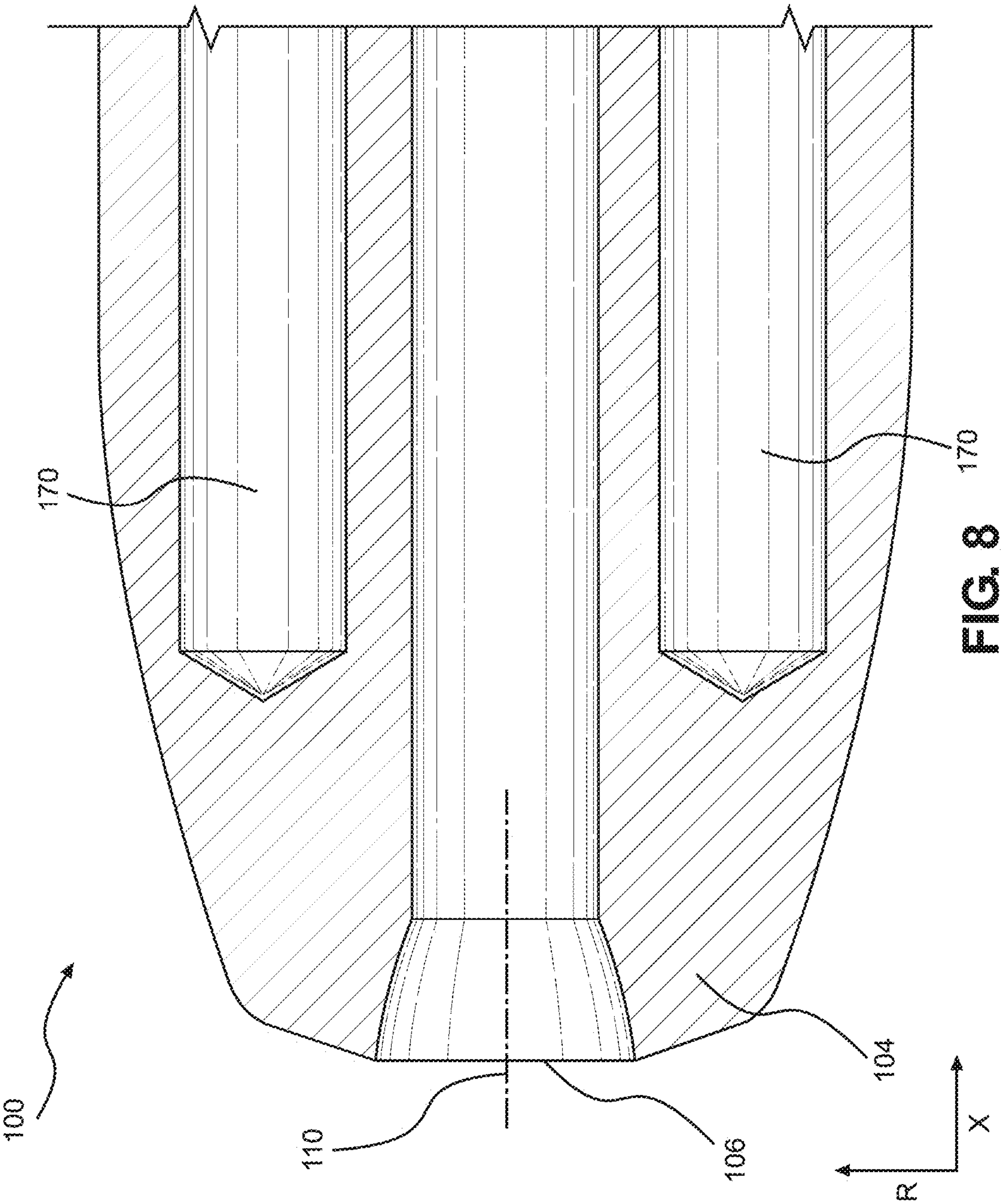
FIG. 8 is another partial cross-sectional view of the multi-function air data probe according to FIG. 5.

FIG. 8 is another partial cross-sectional view of the multi-function air data probe according to FIG. 5.

In particular, FIG. 7 is a partial cross-sectional view of the multi-function air data probe 100 according to FIG. 5. In this regard, FIG. 7 illustrates that an amount of material forming the probe tip 104 of the multi-function air data probe 100 is reduced by the arrangement of the at least one raised portion 200 and/or the curved tip surface 116. More specifically, as the curved tip surface 116 extends radially closer to the probe center line 110, there is less material forming the probe tip 104 of the multi-function air data probe 100.

Further, the multi-function air data probe 100 may include a heater 170 arranged within the probe tip 104 of the multi-function air data probe 100. The heater 170 is shown only schematically in FIG. 7. On the other hand, an exemplary implementation of the heater 170 is shown in FIG. 8.

In aspects, the multi-function air data probe 100 implementing the at least one raised portion 200 may have a higher temperature at the probe tip 104 due to removal of material and heater positioning in comparison to a prior art multi-function air data probes. In particular, reduced material results reduced heating requirements resulting in higher temperature and/or in lower energy usage by the heater 170. This may be beneficial in a reduction of icing of the multi-function air data probe.

In aspects, the multi-function air data probe 100 implementing the at least one raised portion 200 may have a higher temperature provided by the heater 170 at the probe tip 104 and/or a reduced need for heating by the heater 170 due to less material and/or a removal of material by the construction of the at least one raised portion 200 and/or the curved tip surface 116. In this regard, reducing the amount of material in the probe tip 104 may reduce the need for increased operation of the heater 170. Further, the extended construction of the curved tip surface 116 further allows the heater 170 to be positioned closer to the at least one first port 106 to provide increased heating of the probe tip 104.

In one aspect, the heater 170 may be dual redundant, switching from a low-current, high-reliability, dual channel cooperative heating, to nominal current, single channel heating in the event of a heater failure. In response to a heater failure, the aircraft, pilots, a central maintenance system, a flight management system, and/or the like may be notified that a heater has failed and a maintenance action is needed. However, the heater 170 may be configured such that the multi-function air data probe 100 may be still at least partially operative and accordingly certified to fly in icing conditions even if only one channel is operational. Control of the heater 170 may be responsive to a processor, the aircraft, measurement circuitry, a temperature sensor, a pilot, a central maintenance system, a flight management system, and/or the like. In one aspect, the dual redundant configuration of the heater 170 may include dual redundant components for one or more of the various parts of the heater 170. In this aspect, the heater 170 may include one or more dual temperature sensors, dual heating elements, dual power controllers, dual power supplies, dual heating controllers, and/or the like to ensure the ability to be at least partially operative and accordingly certified to fly in icing conditions even if only one channel is operational.

In one aspect, the heater 170 may be a redundant single channel system with a plurality of heaters implemented by a single channel. In this aspect, if one or more of the heaters fail, the remaining heaters may be configured to operate to compensate for the one or more failed heaters. For example, the heater 170 may be configured with adaptive control of a heater duty cycle. In response to a heater failure, the aircraft may be notified that a heater has failed and a maintenance action is needed. However, the heater 170 may be configured such that the multi-function air data probe 100 may be still at least partially operative and accordingly certified to fly in icing conditions even if one or more of the heaters fail.

Figure 9:
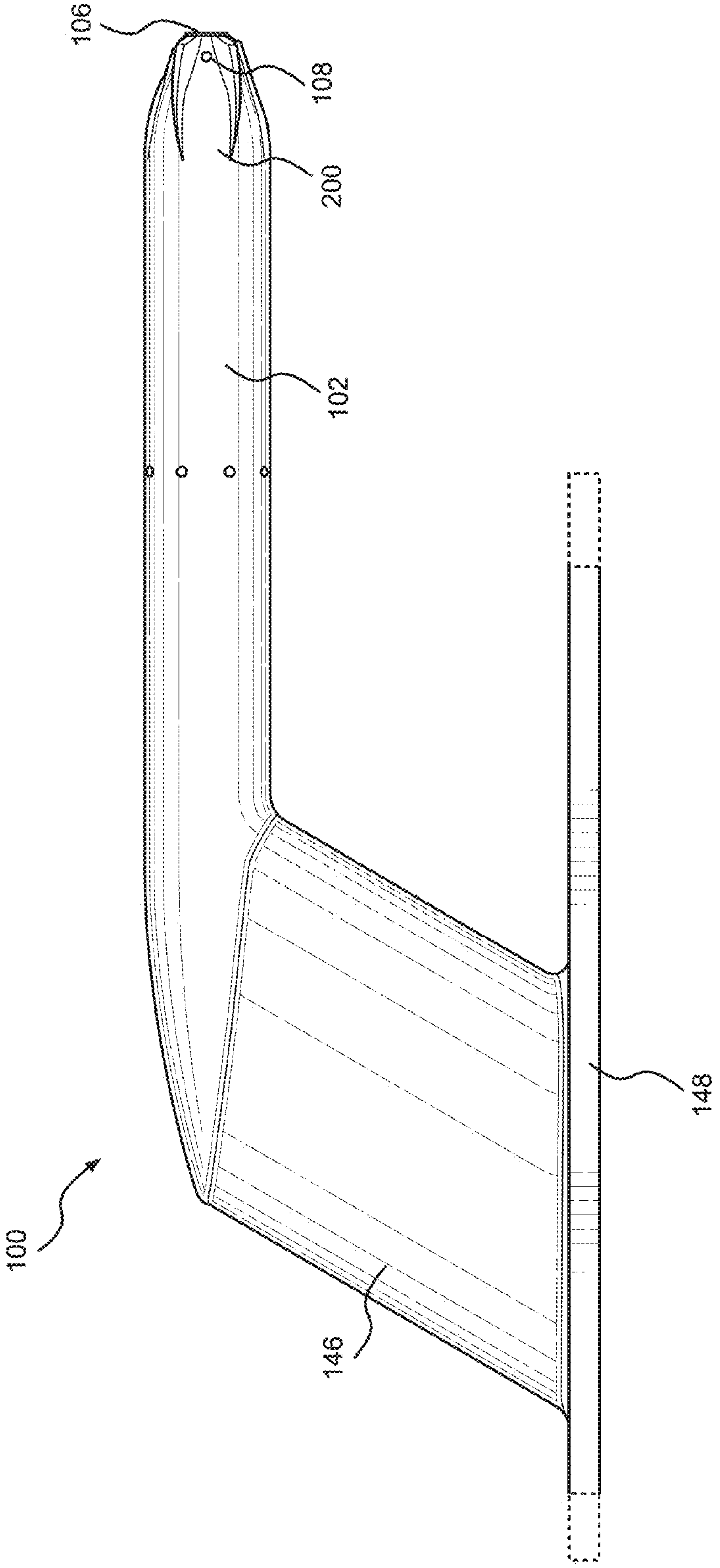
FIG. 9 illustrates an exemplary side view of the multi-function air data probe according to FIG. 1.

FIG. 9 illustrates an exemplary side view of the multi-function air data probe according to FIG. 1.

In particular, FIG. 9 illustrates an exemplary side view of the multi-function air data probe 100 according to FIG. 1. The multi-function air data probe 100 may be configured with support structure 146 configured to extend the probe 102 generally perpendicular to an aircraft skin 148 in order to sense a local airstream. The local airstream being generally along the aircraft skin 148. In one aspect, the multi-function air data probe 100 may be a forward-fuselage mounted sensor. In one aspect, the multi-function air data probe 100 may be electrically anti-iced by the heater 170.

In one aspect, the support structure 146 may include structure for connecting the probe 102 to portions of the multi-function air data probe 100 internal to the aircraft such as a main housing assembly arranged internally within the aircraft.

As further illustrated in FIG. 9, at least the probe 102, the at least one first port 106, the at least one second port 108, and/or the like may be arranged externally on the aircraft. Additionally, the multi-function air data probe 100 may include various operational components including one or more conduits, settling chambers, pressure transducers, manifolds, measurement circuits, and/or the like.

In one aspect, the one or more pressure transducers may be configured to measure a total pressure, a stagnation pressure, a pitot pressure, and/or the like. In some aspects, the output of the one or more pressure transducer may be processed in a processor to generate the angle of attack (AOA), the angle of sideslip (AOS), an airspeed, a Mach number, and/or the like aircraft information.

In one aspect, the multi-function air data probe 100 and the probe 102 may be configured as, in part, an angle of attack sensor to provide normalized angle of attack (AOA) information for flight control systems, a navigation system, a flight management system, a pilot, and/or the like. In one aspect, the multi-function air data probe 100 may be configured as a Stall Warning Transmitter (SWT) to provide stall protection functionality for flight control systems.

In one aspect, the multi-function air data probe 100 may be configured as a single Line-Replaceable Unit (LRU) that may be connected to the main housing assembly of multi-function air data probe 100. The Line-Replaceable Unit (LRU) configuration may be a modular component of the airplane that may be designed to be replaced quickly at an operating location. In this regard, the probe 102 may be mechanically installed and electrically connected to main housing assembly of the multi-function air data probe 100 by the mounting structure by mechanical fasteners and connectors.

In one aspect, the multi-function air data probe 100 may include a flange on the main housing assembly for attachment to the aircraft. In one aspect, the flange may include flange apertures configured to receive one or more mechanical fasteners for fastening the flange and the multi-function air data probe 100 to the aircraft.

In one aspect, the multi-function air data probe 100 may include signal connections on the main housing assembly and/or the rear cover. In one aspect, the signal connections may be connected to the aircraft to provide sensor readings and the like to the aircraft. In one aspect, the signal connections may be electrical connections. In one aspect, the signal connections may be optical connections. In one aspect, the signal connections may be electrical and/or optical connections. In one aspect, the signal connections may also receive sensor readings and/or commands for operating the multi-function air data probe 100 from the aircraft. In one aspect, the signal connections may also receive power for operating the multi-function air data probe 100 from the aircraft.

In one aspect, the processor may include sensor circuitry that may include an analog to digital converter, a filter, other signal conditioning circuitry, and/or the like to determine angle of attack (AOA), rate of change of the angle of attack (AOA), angle of sideslip (AOS), calculate airspeed, Mach number, an altitude, an altitude trend, and/or the like.

In one aspect, the multi-function air data probe 100 may include sensor circuitry that may include an analog to digital converter, a filter, other signal conditioning circuitry, and/or the like and transmit a signal indicative of the angle of attack (AOA), rate of change of the angle of attack (AOA), the angle of sideslip (AOS), and/or the like to the processor. In some aspects, the processor may be configured on or connected to a circuit board, a laminated substrate, a printed circuit board (PCB), a printed wire assembly, a surface that mechanically supports and electrically connects the various electronic components or electrical components, and/or the like within the multi-function air data probe 100.

In aspects, the multi-function air data probe 100 may include hardware that may be responsible for all environmental protection, any power conditioning, and conversion, raw signal sensing, relay of signal data, and/or the like. The multi-function air data probe 100 may include software implemented by a processor such as the processor that may be responsible for data monitoring, data conversion, calculations, operational modes, coordinating/configuring hardware to sense, send, or receive data, and/or the like.

The multi-function air data probe 100 may include a power supply module. The power supply module may provide conditioned power to a stall warning computer, angular position transmitter electronics, the pressure transducer, the measurement circuitry, the processor, and/or other components. In some aspects, the power supply module may be configured on a printed circuit board, on a printed wire assembly, and/or the like within the multi-function air data probe 100.

The multi-function air data probe 100 may include an input/output (I/O) module. The input/output (I/O) module may relay signals and may connect to power buses between external aircraft systems, Stall Warning Transmitter (SWT) hardware, and/or the like. The input/output (I/O) module may also provide the circuitry to meet lightning, Electromagnetic Interference (EMI), high-intensity radiated field (HIRF) requirements, and/or the like.

The multi-function air data probe 100 can be mechanically mounted on either the port side, the starboard side, or both sides of the forward fuselage and may electrically connect to several aircraft discretes, power, dual redundant ARINC communication busses, and the like through signal connections. However, it should be noted that any type of data bus may be utilized including ARINC, MIL-STD-1553 (military standard), Controller Area Network (CAN), and the like. The multi-function air data probe 100 may also provide a maintenance interface, not connected to the aircraft, allowing for configurations, alignment adjustments, software uploads, and/or the like.

In one aspect, the multi-function air data probe 100 may be implemented in part as a Stall Warning Transmitter (SWT) and may provide stall warning and protection by utilizing the multi-function air data probe 100. The Stall Warning Transmitter (SWT) may calculate a normalized AOA (AOAN), presented as a fraction of the angle of attack interval from zero lift to stall, for a particular configuration of the host aircraft. A distinct aircraft configuration may be determined by the combined state of the flaps, speed brake, anti-ice, and/or the like input parameters to the Stall Warning Transmitter (SWT). From the AOAN, host configuration, and detailed lift curves, and/or the like, the Stall Warning Transmitter (SWT) may calculate and enact various stall warning limits such as: Horn, Stick Shake, and Stick Push.

Accordingly, the disclosure has provided a multi-function air data probe and a multi-function air data probe process with increased accuracy and/or the like. Additionally, the disclosure has provided a multi-function air data probe and a multi-function air data probe process with improved heating functionality, deicing functionality, heating requirements, reduced energy usage, and/or the like.

The following are a number of nonlimiting EXAMPLES of aspects of the disclosure.

One EXAMPLE: a multi-function air data probe includes a probe component. The multi-function air data probe in addition includes a probe tip. The multi-function air data probe moreover includes at least one first port and at least one second port configured as angle of attack (AOA) measurement ports, angle of sideslip (AOS) measurement ports, static pressure measurement ports, and/or a pitot pressure inlet port. The multi-function air data probe also includes at least one raised portion arranged on the probe tip.

The above-noted EXAMPLE may further include any one or a combination of more than one of the following EXAMPLES:

The multi-function air data probe of the above-noted EXAMPLE where the at least one second port is arranged on the probe tip and in proximity to the at least one raised portion. The multi-function air data probe of the above-noted EXAMPLE where the at least one second port is arranged on the probe tip vertically adjacent the at least one raised portion. The multi-function air data probe of the above-noted EXAMPLE where the at least one second port is arranged on the probe tip and between implementations of the at least one raised portion. The multi-function air data probe of the above-noted EXAMPLE where there are four implementations of the at least one raised portion arranged radially and symmetrically around the probe tip in a cross pattern. The multi-function air data probe of the above-noted EXAMPLE where implementations of the at least one second port are arranged between each implementation of the at least one raised portion. The multi-function air data probe of the above-noted EXAMPLE where the at least one first port is configured as a pitot pressure inlet. The multi-function air data probe of the above-noted EXAMPLE where the at least one raised portion is configured to increase a sensitivity of measurements of various airflow characteristics and/or aircraft flight characteristics by the at least one first port and/or the at least one second port. The multi-function air data probe of the above-noted EXAMPLE where the at least one raised portion is configured to limit flow separation behavior at or around the probe and/or the probe tip. The multi-function air data probe of the above-noted EXAMPLE where the at least one raised portion of the multi-function air data probe is configured to increase an envelope of accuracy of measurement of various airflow characteristics and/or aircraft flight characteristics of the multi-function air data probe. The multi-function air data probe of the above-noted EXAMPLE where the at least one raised portion is configured make the multi-function air data probe be less dependent on airspeed and an addition of an angle of sideslip (AOS). The multi-function air data probe of the above-noted EXAMPLE where the at least one raised portion is configured to make the multi-function air data probe have improved linearity with respect to various airflow characteristics and/or aircraft flight characteristics measured by the at least one first port and the at least one second port. The multi-function air data probe of the above-noted EXAMPLE where the at least one first port is arranged at a forward end of the probe such that the at least one first port directly receives an airflow. The multi-function air data probe of the above-noted EXAMPLE where the at least one raised portion is arranged downstream from the at least one first port and a forward end of the probe. The multi-function air data probe of the above-noted EXAMPLE where the at least one raised portion extends along the probe tip along a longitudinal axis. The multi-function air data probe of the above-noted EXAMPLE where the at least one raised portion extends radially outwardly from a probe center line of the multi-function air data probe. The multi-function air data probe of the above-noted EXAMPLE where the at least one raised portion extends radially outwardly from a surface of the probe tip. The multi-function air data probe of the above-noted EXAMPLE where the at least one raised portion includes a ridge leading edge. The multi-function air data probe of the above-noted EXAMPLE where the ridge leading edge is arranged adjacent and/or directly adjacent the at least one first port. The multi-function air data probe of the above-noted EXAMPLE where the ridge leading edge is arranged adjacent and/or directly adjacent a forward end of the probe. The multi-function air data probe of the above-noted EXAMPLE where the at least one raised portion includes a ridge trailing edge. The multi-function air data probe of the above-noted EXAMPLE where the ridge trailing edge is arranged distally from the at least one first port and/or the ridge leading edge. The multi-function air data probe of the above-noted EXAMPLE where the ridge trailing edge is arranged distally from a forward end of the probe. The multi-function air data probe of the above-noted EXAMPLE where the ridge leading edge of the at least one raised portion is arranged radially closer to a probe center line of the probe then the ridge trailing edge of the at least one raised portion. The multi-function air data probe of the above-noted EXAMPLE where the at least one raised portion includes a connecting surface that extends from the ridge leading edge to the ridge trailing edge. The multi-function air data probe of the above-noted EXAMPLE where the connecting surface is a curved surface that extends from the ridge leading edge to the ridge trailing edge. The multi-function air data probe of the above-noted EXAMPLE where the at least one second port is arranged in the probe tip adjacent to the at least one raised portion. The multi-function air data probe of the above-noted EXAMPLE where the ridge leading edge is configured to have a leading edge width or a radial leading edge width; and a ridge trailing edge is configured to have a trailing edge width or a radial trailing edge width; and where the leading edge width of the ridge leading edge is smaller than the trailing edge width of the ridge trailing edge. The multi-function air data probe of the above-noted EXAMPLE where the at least one second port is arranged between two implementations of the at least one raised portion. The multi-function air data probe of the above-noted EXAMPLE where the probe includes a curved tip surface that extends from a forward end and/or the at least one first port toward a back of the multi-function air data probe and/or a main body of the multi-function air data probe. The multi-function air data probe of the above-noted EXAMPLE where the curved tip surface is arranged closest to a probe center line adjacent a forward end and/or the at least one first port; and where the curved tip surface is arranged farthest from the probe center line as the curved tip surface approaches the main body. The multi-function air data probe of the above-noted EXAMPLE whereas the curved tip surface extends from a forward end, a shape thereof may transition into the shape of the main body. The multi-function air data probe of the above-noted EXAMPLE where the at least one raised portion extends radially from a probe center line. The multi-function air data probe of the above-noted EXAMPLE where the at least one raised portion is arranged closest to a probe center line adjacent a forward end and/or the at least one first port; and where the at least one raised portion is arranged farthest from the probe center line as the at least one raised portion approaches a main body. The multi-function air data probe of the above-noted EXAMPLE whereas the at least one raised portion extends from a forward end, a shape thereof may transition into the shape of a main body. The multi-function air data probe of the above-noted EXAMPLE where the at least one raised portion includes ridge side surfaces. The multi-function air data probe of the above-noted EXAMPLE where the ridge side surfaces extend along a longitudinal axis from a ridge leading edge to a ridge trailing edge. The multi-function air data probe of the above-noted EXAMPLE where the ridge side surfaces extend from a connecting surface to a curved tip surface. The multi-function air data probe of the above-noted EXAMPLE where a construction and arrangement of a ridge leading edge, a ridge trailing edge, and the ridge side surfaces of the at least one raised portion provide a curved surface around and/or adjacent the at least one second port. The multi-function air data probe of the above-noted EXAMPLE where a construction and arrangement of a ridge leading edge, a ridge trailing edge, and ridge side surfaces of the at least one raised portion provide a curved surface connected to a curved tip surface of the probe tip. The multi-function air data probe of the above-noted EXAMPLE where a construction and arrangement of a ridge leading edge, a ridge trailing edge, and ridge side surfaces of the at least one raised portion provide a non-faceted and/or smooth edged construction of the probe tip. The multi-function air data probe of the above-noted EXAMPLE where a construction and arrangement of a ridge leading edge, a ridge trailing edge, and ridge side surfaces of the at least one raised portion provide flow separation for the at least one second port. The multi-function air data probe of the above-noted EXAMPLE where a construction and arrangement of a ridge leading edge, a ridge trailing edge, and ridge side surfaces of the at least one raised portion generate turbulent air adjacent the probe tip. The multi-function air data probe of the above-noted EXAMPLE where the turbulent air adjacent the probe tip results in increased ice deflection. The multi-function air data probe of the above-noted EXAMPLE where an amount of material forming the probe tip of the multi-function air data probe is reduced by an arrangement of the at least one raised portion and/or a curved tip surface. The multi-function air data probe of the above-noted EXAMPLE includes a heater arranged within the probe tip, where the multi-function air data probe implementing the at least one raised portion may have a higher temperature at the probe tip due to the at least one raised portion.

One EXAMPLE: a multi-function air data probe includes a probe component. The multi-function air data probe in addition includes a probe tip. The multi-function air data probe moreover includes at least one raised portion arranged on the probe tip.

The above-noted EXAMPLE may further include any one or a combination of more than one of the following EXAMPLES:

The multi-function air data probe of the above-noted EXAMPLE includes at least one first port and at least one second port configured as angle of attack (AOA) measurement ports, angle of sideslip (AOS) measurement ports, static pressure measurement ports, and/or a pitot pressure inlet port. The multi-function air data probe of the above-noted EXAMPLE where the at least one second port is arranged on the probe tip and in proximity to the at least one raised portion. The multi-function air data probe of the above-noted EXAMPLE where the at least one second port is arranged on the probe tip vertically adjacent the at least one raised portion. The multi-function air data probe of the above-noted EXAMPLE where the at least one second port is arranged on the probe tip and between implementations of the at least one raised portion. The multi-function air data probe of the above-noted EXAMPLE where implementations of the at least one second port are arranged between each implementation of the at least one raised portion. The multi-function air data probe of the above-noted EXAMPLE where the at least one first port is configured as a pitot pressure inlet. The multi-function air data probe of the above-noted EXAMPLE where the at least one raised portion is configured to increase a sensitivity of measurements of various airflow characteristics and/or aircraft flight characteristics by the at least one first port and/or the at least one second port. The multi-function air data probe of the above-noted EXAMPLE where the at least one raised portion is configured to make the multi-function air data probe have improved linearity with respect to various airflow characteristics and/or aircraft flight characteristics measured by the at least one first port and the at least one second port. The multi-function air data probe of the above-noted EXAMPLE where the at least one first port is arranged at a forward end of the probe such that the at least one first port directly receives an airflow. The multi-function air data probe of the above-noted EXAMPLE where the at least one raised portion is arranged downstream from the at least one first port and a forward end of the probe. The multi-function air data probe of the above-noted EXAMPLE where the at least one raised portion includes a ridge leading edge. The multi-function air data probe of the above-noted EXAMPLE where the ridge leading edge is arranged adjacent and/or directly adjacent the at least one first port. The multi-function air data probe of the above-noted EXAMPLE where the ridge leading edge is arranged adjacent and/or directly adjacent a forward end of the probe. The multi-function air data probe of the above-noted EXAMPLE where the at least one raised portion includes a ridge trailing edge. The multi-function air data probe of the above-noted EXAMPLE where the ridge trailing edge is arranged distally from the at least one first port and/or the ridge leading edge. The multi-function air data probe of the above-noted EXAMPLE where the ridge trailing edge is arranged distally from a forward end of the probe. The multi-function air data probe of the above-noted EXAMPLE where the ridge leading edge of the at least one raised portion is arranged radially closer to a probe center line of the probe then the ridge trailing edge of the at least one raised portion. The multi-function air data probe of the above-noted EXAMPLE where the at least one raised portion includes a connecting surface that extends from the ridge leading edge to the ridge trailing edge. The multi-function air data probe of the above-noted EXAMPLE where the connecting surface is a curved surface that extends from the ridge leading edge to the ridge trailing edge. The multi-function air data probe of the above-noted EXAMPLE where the at least one second port is arranged in the probe tip adjacent to the at least one raised portion. The multi-function air data probe of the above-noted EXAMPLE where the ridge leading edge is configured to have a leading edge width or a radial leading edge width; and a ridge trailing edge is configured to have a trailing edge width or a radial trailing edge width; and where the leading edge width of the ridge leading edge is smaller than the trailing edge width of the ridge trailing edge. The multi-function air data probe of the above-noted EXAMPLE where the at least one second port is arranged between two implementations of the at least one raised portion. The multi-function air data probe of the above-noted EXAMPLE where the probe includes a curved tip surface that extends from a forward end and/or the at least one first port toward a back of the multi-function air data probe and/or a main body of the multi-function air data probe. The multi-function air data probe of the above-noted EXAMPLE where the curved tip surface is arranged closest to a probe center line adjacent a forward end and/or the at least one first port; and where the curved tip surface is arranged farthest from the probe center line as the curved tip surface approaches the main body. The multi-function air data probe of the above-noted EXAMPLE whereas the curved tip surface extends from a forward end, a shape thereof may transition into the shape of the main body. The multi-function air data probe of the above-noted EXAMPLE where the at least one raised portion is arranged closest to a probe center line adjacent a forward end and/or the at least one first port; and where the at least one raised portion is arranged farthest from the probe center line as the at least one raised portion approaches a main body. The multi-function air data probe of the above-noted EXAMPLE where the at least one raised portion includes ridge side surfaces. The multi-function air data probe of the above-noted EXAMPLE where the ridge side surfaces extend along a longitudinal axis from a ridge leading edge to a ridge trailing edge. The multi-function air data probe of the above-noted EXAMPLE where the ridge side surfaces extend from a connecting surface to a curved tip surface. The multi-function air data probe of the above-noted EXAMPLE where a construction and arrangement of a ridge leading edge, a ridge trailing edge, and the ridge side surfaces of the at least one raised portion provide a curved surface around and/or adjacent the at least one second port. The multi-function air data probe of the above-noted EXAMPLE where a construction and arrangement of a ridge leading edge, a ridge trailing edge, and ridge side surfaces of the at least one raised portion provide flow separation for the at least one second port. The multi-function air data probe of the above-noted EXAMPLE where there are four implementations of the at least one raised portion arranged radially and symmetrically around the probe tip in a cross pattern. The multi-function air data probe of the above-noted EXAMPLE where the at least one raised portion is configured to limit flow separation behavior at or around the probe and/or the probe tip. The multi-function air data probe of the above-noted EXAMPLE where the at least one raised portion of the multi-function air data probe is configured to increase an envelope of accuracy of measurement of various airflow characteristics and/or aircraft flight characteristics of the multi-function air data probe. The multi-function air data probe of the above-noted EXAMPLE where the at least one raised portion is configured make the multi-function air data probe be less dependent on airspeed and an addition of an angle of sideslip (AOS). The multi-function air data probe of the above-noted EXAMPLE where the at least one raised portion extends along the probe tip along a longitudinal axis. The multi-function air data probe of the above-noted EXAMPLE where the at least one raised portion extends radially outwardly from a probe center line of the multi-function air data probe. The multi-function air data probe of the above-noted EXAMPLE where the at least one raised portion extends radially outwardly from a surface of the probe tip. The multi-function air data probe of the above-noted EXAMPLE where the at least one raised portion extends radially from a probe center line. The multi-function air data probe of the above-noted EXAMPLE whereas the at least one raised portion extends from a forward end, a shape thereof may transition into the shape of a main body. The multi-function air data probe of the above-noted EXAMPLE where a construction and arrangement of a ridge leading edge, a ridge trailing edge, and ridge side surfaces of the at least one raised portion provide a curved surface connected to a curved tip surface of the probe tip. The multi-function air data probe of the above-noted EXAMPLE where a construction and arrangement of a ridge leading edge, a ridge trailing edge, and ridge side surfaces of the at least one raised portion provide a non-faceted and/or smooth edged construction of the probe tip. The multi-function air data probe of the above-noted EXAMPLE where a construction and arrangement of a ridge leading edge, a ridge trailing edge, and ridge side surfaces of the at least one raised portion generate turbulent air adjacent the probe tip. The multi-function air data probe of the above-noted EXAMPLE where the turbulent air adjacent the probe tip results in increased ice deflection. The multi-function air data probe of the above-noted EXAMPLE where an amount of material forming the probe tip of the multi-function air data probe is reduced by an arrangement of the at least one raised portion and/or a curved tip surface. The multi-function air data probe of the above-noted EXAMPLE includes a heater arranged within the probe tip, where the multi-function air data probe implementing the at least one raised portion may have a higher temperature at the probe tip due to the at least one raised portion.

The many features and advantages of the disclosure are apparent from the detailed specification, and, thus, it is intended by the appended claims to cover all such features and advantages of the disclosure, which fall within the true spirit, and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A multi-function air data probe comprising:

a probe sleeve;

a probe tip extending from the probe sleeve, the probe tip having at least one first port, and a plurality of second ports configured as angle of attack (AOA) measurement ports, angle of sideslip (AOS) measurement ports, static pressure measurement ports, and/or a pitot pressure inlet port; and a plurality of circumferentially spaced raised portions arranged on the probe tip, wherein each of the plurality of second ports is provided between adjacent ones of the plurality of circumferentially spaced raised portions.

2. The multi-function air data probe according to claim 1 further comprising concave facets on opposite sides of each of the plurality of raised portions.

3. The multi-function air data probe according to claim 1 wherein each of the plurality of raised portions comprises a raised partition configured to generate stronger pressure differences.

4. The multi-function air data probe according to claim 1 wherein each of the plurality of raised portions comprises a raised partition configured to generate a strong region of suction when at angle inclined to an air flow.

5. The multi-function air data probe according to claim 1 wherein the plurality of raised portions includes four raised portions arranged radially and symmetrically around the probe tip in a cross pattern.

6. The multi-function air data probe according to claim 1 wherein the at least one first port is configured as a pitot pressure inlet.

7. The multi-function air data probe according to claim 1 wherein the plurality of raised portions are configured to make the multi-function air data probe have improved linearity with respect to various airflow characteristics and/or aircraft flight characteristics measured by the at least one first port and the at least one second port.

8. The multi-function air data probe according to claim 1 wherein the plurality of raised portions are arranged downstream from the at least one first port and upstream of a forward end of the probe sleeve.

9. The multi-function air data probe according to claim 1 wherein the plurality of raised portions extend along the probe tip along a longitudinal axis.

10. The multi-function air data probe according to claim 1 wherein the plurality of raised portions extend radially outwardly from a probe center line of the multi-function air data probe.

11. The multi-function air data probe according to claim 1 wherein the plurality of raised portions extend radially outwardly from a surface of the probe tip.

12. The multi-function air data probe according to claim 1, further comprising a heater disposed within the probe tip, wherein the heater is positioned closer to the at least one first port than the probe sleeve.

13. The multi-function air data probe according to claim 1, wherein each of the plurality of raised portions has a leading edge and a trailing edge, each leading edge being adjacent and/or directly adjacent an end of the probe tip.

14. The multi-function air data probe according to claim 13, wherein each leading edge is closer to a longitudinal axis of the probe than the trailing edge.

15. A multi-function air data probe comprising:

a probe sleeve;

a probe tip extending from the probe sleeve, the probe tip having an end with at least one first port, and a plurality of second ports; and a plurality of circumferentially spaced raised portions arranged on and extending radially outwardly from the probe tip, each raised portion having a leading edge and a trailing edge, the leading edge being adjacent and/or directly adjacent the end of the probe tip, wherein each of the plurality of second ports is provided between adjacent ones of the plurality of circumferentially spaced raised portions.

16. The multi-function air data probe according to claim 15, further comprising concave facets on opposite sides of each of the plurality of raised portions.

17. The multi-function air data probe according to claim 15, wherein the plurality of raised portions includes four raised portions arranged radially and symmetrically around the probe tip in a cross pattern.

18. The multi-function air data probe according to claim 15, wherein the plurality of raised portions extend along the probe tip along a longitudinal axis.

19. The multi-function air data probe according to claim 15, wherein each of the plurality of raised portions has a leading edge and a trailing edge, each leading edge being adjacent and/or directly adjacent an end of the probe tip.

20. The multi-function air data probe according to claim 19, wherein each leading edge is closer to a longitudinal axis of the probe than the trailing edge.

* * * * *